(12) United States Patent
Kwon et al.

(10) Patent No.: US 7,722,932 B2
(45) Date of Patent: May 25, 2010

(54) ONE SOLUTION-TYPE THERMOSETTING COMPOSITIONS FOR COLOR FILTER PROTECTIVE FILMS AND COLOR FILTERS USING THE SAME

(75) Inventors: O Bum Kwon, Seoul (KR); Hyun Moon Choi, Gyeonggi-do (KR); Sun Yul Lee, Gyeonggi-do (KR); Kil Sung Lee, Gyeonggi-do (KR)

(73) Assignee: Cheil Industries, Inc. (KR)

( * ) Notice: Subject to any disclaimer, the term of this patent is extended or adjusted under 35 U.S.C. 154(b) by 561 days.

(21) Appl. No.: 11/623,866

(22) Filed: Jan. 17, 2007

(65) Prior Publication Data
US 2008/0015283 A1    Jan. 17, 2008

(30) Foreign Application Priority Data
Jul. 13, 2006  (KR) .................... 10-2006-0065645

(51) Int. Cl.
*C09K 19/52* (2006.01)
*B32B 27/30* (2006.01)
*B32B 27/38* (2006.01)
*C08L 33/00* (2006.01)
*C08L 53/00* (2006.01)
*C08L 63/00* (2006.01)

(52) U.S. Cl. .................... 427/386; 428/1.1; 428/1.3; 428/1.33; 428/413; 525/88; 525/95; 525/107; 525/117; 525/119; 525/523; 525/524; 525/529; 525/530; 525/533

(58) Field of Classification Search ............... 427/385.5, 427/386; 428/1.1, 1.3, 1.31, 1.33, 413; 525/88, 525/89, 95, 107, 117, 119, 191, 523, 524, 525/529, 530, 533
See application file for complete search history.

(56) References Cited

U.S. PATENT DOCUMENTS 5,565,537 A * 10/1996 Uda et al. ............... 526/262

2007/0059546 A1   3/2007  Kwon et al.

FOREIGN PATENT DOCUMENTS

| JP | 62163016 A | | 7/1987 |
|---|---|---|---|
| JP | 63131103 A | | 6/1988 |
| JP | 1-134306 A | | 5/1989 |
| JP | 06-145595 A | * | 5/1994 |
| JP | 07-053638 A | * | 5/1995 |
| JP | 8-50289 A | | 2/1996 |
| JP | 8-201617 A | | 8/1996 |
| JP | 2001091732 A | | 4/2001 |
| JP | 2001-164072 A | * | 6/2001 |
| JP | 2002-062651 | | 2/2002 |
| JP | 2005-049720 A | * | 2/2005 |
| JP | 2006-209113 A | * | 8/2006 |
| JP | 2008-031417 | | 2/2008 |

OTHER PUBLICATIONS

Machine translation of JP 2001-164072 A, provided by the JPO website (2001).*
Machine translation of JP 2006-209113 A, provided by the JPO website (2006).*
Machine translation of JP 2005-049720 A, provided by the JPO website (2005).*
Machine translation of JP 07-053638 A, provided by the JPO website (1995).*
Machine translation of JP 06-145595 A, provided by the JPO website (1994).*
Machine translation of JP 2002-062651, provided by the JPO website (2002).*

* cited by examiner

*Primary Examiner*—Michael J Feely
(74) *Attorney, Agent, or Firm*—Myers Bigel Sibley & Sajovec PA

(57) ABSTRACT

Provided herein are one-solution type thermosetting resin compositions that may be useful to form protective films for color filters used in liquid crystal displays or image sensors. According to some embodiments, the resin compositions may include a self-curable copolymer and an epoxy compound. The protective films may exhibit desirable flatness, adhesiveness, transmittance, heat resistance and chemical resistance. Also provided are methods of forming a film on a substrate, and substrates having a film formed thereon. In addition, provided herein are color filters including a film formed from a composition according to an embodiment of the invention, and liquid crystal displays and image sensors including such color filters.

13 Claims, No Drawings

ONE SOLUTION-TYPE THERMOSETTING COMPOSITIONS FOR COLOR FILTER PROTECTIVE FILMS AND COLOR FILTERS USING THE SAME

CROSS-REFERENCE TO RELATED APPLICATION

This application claims priority under 35 U.S.C. § 119 from Korean Patent Application No. 10-2006-0065645, filed on Jul. 13, 2006, in the Korean Intellectual Property Office, the disclosure of which is incorporated by reference herein as if set forth in its entirety.

FIELD OF THE INVENTION

The present invention relates to one solution-type compositions for protective films for color filters. Further, the invention relates to color filters including a protective film formed from a one solution-type composition, and to liquid crystal displays and image sensors including such color filters.

BACKGROUND OF THE INVENTION

In general, protective films are formed on the surface of color filters in liquid crystal displays (LCDs) for the purpose of planarizing and protecting the color filters. Ideally, such surface-protective films should have the desirable optical transparency and also possess sufficient film strength. In addition, such surface-protective films should have sufficient heat resistance to withstand subsequent processes for forming transparent conductive films on the protective films. Further, in some LCDs, such as vertical-alignment LCDs, it is also desirable that the surface-protective films possess sufficient acid resistance to withstand etching and sufficient base resistance to withstand resist peeling.

Materials and methods for forming protective films for color filters are known in the art. For example, Japanese Patent Laid-Open No. Hei 1-134306 describes the use of glycidyl methacrylate as a main component in a protective film, Japanese Patent Laid-Open No. Sho 62-163016 describes the use of a polyimide as a main component in a protective film and Japanese Patent Laid-Open No. Sho 63-131103 describes the use of a mixture of a melamine resin and an epoxy resin as a main component in a protective film.

Epoxy resins have been shown to have desirable properties in terms of adhesive strength and resistance to heat, chemicals and water. For example, Japanese Patent Laid-Open No. Hei 08-050289 describes a curable resin composition including a glycidyl methacrylate polymer and a phenolic curing agent. Japanese Patent Laid Open No. Hei 08-201617 describes a resin composition including an epoxy resin, a curing agent, and an organic solvent, wherein the curing agent is the reaction product of a styrene-maleic anhydride copolymer and an amine.

Epoxy resins may react rapidly with curing agents. Thus, when epoxy resins are mixed with curing agents in so-called "two solution-type" or "two-pot" compositions, they are generally mixed immediately before use. In contrast, "one solution-type" or "one pot" compositions may be applied to a substrate in substantially the same form that they are stored in. Two solution-type compositions may be difficult to handle and may be unsuitable for industrial scale use due to the need for mixing and the relatively limited time frame for application after mixing However, epoxy resins have been generally known in the art to be unsuitable for use in one solution-type compositions.

Other two solution-type compositions have been modified to improve storage stability. For example, Japanese Patent Laid-Open No. 2001-091732 describes a technique for improving storage stability by protecting a polyfunctional carboxylic compound with a vinyl ether. However, the protection of the polyfunctional carboxylic acid may require a complicated procedure. Further, the vinyl ether may be harmful to humans, and so the industrial applicability of this procedure is uncertain.

Thus, it would be desirable to prepare one solution-type compositions that provide the desirable transparency, film strength, heat resistance, acid resistance and base resistance.

SUMMARY OF THE INVENTION

According to some embodiments of the present invention, thermosetting one solution-type compositions for a protective film for a color filter include
(i) about 1 to about 45% by weight of a self-curable copolymer including
(a) a repeating unit of each of Formulae I, I, III and IV:

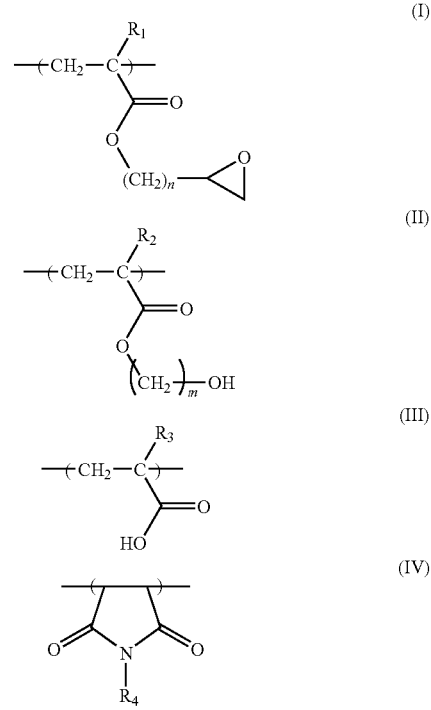

wherein $R_1$, $R_2$ and $R_3$ may each independently be hydrogen or an alkyl group; $R_4$ may be an alkyl, aryl, alkylaryl or alkoxyaryl; and n and m may each independently be an integer in a range of about 1 to about 10; and
(ii) about 1 to about 45% by weight of an epoxy compound.

In some embodiments of the invention, the self-curable copolymer includes about 10 to about 89 mol % of the repeating unit of Formula 1; about 5 to about 35 mol % of the repeating unit of Formula 2; about 5 to about 35 mol % of the repeating unit of Formula 3; and about 1 to about 20 mol % of the repeating unit of Formula 4.

Furthermore, in some embodiments of the invention, the epoxy compound may include a bisphenol A-type epoxy resin, a bisphenol F-type epoxy resin, a phenol novolac-type epoxy resin, a cresol novolac-type epoxy resin, or any mixture thereof.

In addition, in some embodiments of the invention, the self-curable copolymer may further include at least one of an acrylate monomer, a methacrylate monomer, an acrylamide monomer, a methacrylamide monomer, a styrene monomer, N-vinylpyrrolidone, N-vinylformamide, N-vinylamide and N-vinylimidazole.

In some embodiments of the invention, the thermosetting one solution-type compositions may also include about 10 to about 98% by weight of an organic solvent.

In some embodiments of the invention, the compositions may also include a silane coupling agent in an amount in a range of about 0.1 to about 30 parts by weight, based on 100 parts by weight of the self-curable copolymer.

In some embodiments of the invention, provided are substrates including a film formed thereon, wherein the film is formed from a composition according to an embodiment of the invention. Also provided are methods of forming a film on a substrate including applying a composition according to an embodiment of the invention, and subjecting the composition to conditions sufficient to cure the composition.

Also provided according to some embodiments of the invention are color filters that include a protective film formed from a composition according to an embodiment of the invention.

In addition, provided herein are liquid crystal displays and image sensors that include a color filter according to an embodiment of the invention.

DETAILED DESCRIPTION OF EMBODIMENTS OF THE INVENTION

The invention is described more fully hereinafter. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element or layer is referred to as being "on," another element or layer, it can be directly on, connected to, or coupled to the other element or layer, or intervening elements or layers may be present. In contrast, when an element is referred to as being "directly on," "directly connected to," or "directly coupled to" another element or layer, there are no intervening elements or layers present. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein:

The term "alkyl" refers to a monovalent, straight, branched or cyclic hydrocarbon ("cycloalkyl") radical having from 1 to 15 carbon atoms. In some embodiments, the alkyl may be a "$C_1$-$C_4$ alkyl," wherein the alkyl group has 1 to 4 carbons. For example, lower alkyl may include methyl, ethyl, propyl, iso-propyl, butyl, iso-butyl and the like. The term $C_x$ alkyl refers to an alkyl with x carbon atom(s), and thus, the term $C_1$-$C_4$ alkyl refers to any alkyl having from 1 to 4 carbon atoms. Exemplary cycloalkyl include $C_5$-$C_{13}$ cycloalkyl.

The term "aryl" refers to a monovalent aromatic radical, which may optionally include 1 to 3 additional rings (e.g., cycloalkyl) fused thereto. An aryl ring may be unsubstituted or substituted, for example, with one or more (e.g., one, two or three) of a halo, alkyl, aryl, and the like. Exemplary aryl groups may include phenyl (Ph), naphthyl, and the like.

The term "alkylaryl" refers to an aryl radical, as defined herein, substituted with one or more alkyl, as defined herein. Exemplary alkylaryl include $C_1$-$C_4$ alkyl-substituted phenyl.

The term "alkoxyaryl" refers to an aryl radical, as defined herein, substituted with one or more alkoxy groups (—OR, wherein R is alkyl, as defined herein). Exemplary alkoxyaryl include $C_1$-$C_4$ alkoxy-substituted phenyl.

The term "one solution-type" composition refers to a "one pot" composition which may be applied to a substrate, or used in any other suitable manner, in substantially the same form that it is stored in. This is contrasted to "two solution-type" compositions, in which two or more components are mixed immediately prior to use. The need for mixing immediately prior to use may arise due to rapid curing of the composition.

The term "self-curable copolymer" is meant to refer to a copolymer that may crosslink without the addition of any other polymer or reagent. However, the crosslinking of a self-curable copolymer may be facilitated by the addition of catalysts, couplers, or other reagents known to one of skill in the art. The crosslinking may also be facilitated by thermal or photochemical treatment, or any other technique known to one of skill in the art.

The present invention provides a one-solution type thermosetting resin composition for a protective film for a color filter including a self-curable copolymer and an epoxy compound.

According to some embodiments of the present invention, thermosetting one solution-type compositions for a protective film for a color filter include (i) a self-curable copolymer including a repeating unit of each of Formulae I, II, III and IV:

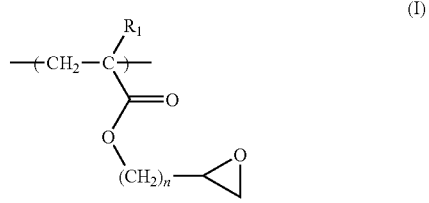

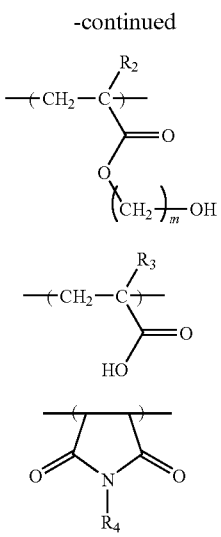

wherein $R_1$, $R_2$ and $R_3$ may each independently be a hydrogen or an alkyl group; $R_4$ may be an alkyl, aryl, alkylaryl or alkoxyaryl; and n and m may each independently be an integer in a range of about 1 to about 10; and (ii) an epoxy compound.

In some embodiments of the invention, the self-curable copolymer may be present in an amount in a range of about 1 to about 45% by weight, and the epoxy compound may be present in an amount in a range of about 1 to about 45% by weight, based on the total weight of the resin composition. In some embodiments, the epoxy compound may be present in an amount in a range of about 5 to about 30% by weight, based on the total weight of the resin composition. When the epoxy compound is present in an amount of less than about 1% by weight, the dimensional stability of a protective film formed using the resin composition may be deteriorated. Meanwhile, when the epoxy compound is present in an amount greater than about 45% by weight, the resin composition may produce less desirable films.

In some embodiments of the invention, the self-curable copolymer includes about 10 to about 89 mol % of the repeating unit of Formula 1; about 5 to about 35 mol % of the repeating unit of Formula 2; about 5 to about 35 mol % of the repeating unit of Formula 3; and about 1 to about 20 mol % of the repeating unit of Formula 4.

The self-curable copolymer including the repeating units of Formulae 1 to 4 may be a random, alternating, block or graft copolymer. Since a thermal crosslinking reaction may occur between the repeating unit of Formula I and at least one of the repeating units of Formulae 2 and 3, in some embodiments, the self-curable copolymer may exhibit thermosetting properties.

In some embodiments of the invention, the self-curable copolymer may further include at least one other repeating unit. For example, the self-curing copolymer may include at least one of an (meth)acrylate monomer, including methyl (meth)acrylate, ethyl (meth)acrylate, propyl(meth)acrylate, isopropyl(meth)acrylate, butyl(meth)acrylate, and benzyl (meth)acrylate; a (meth)acrylamide monomer, including N-methylacrylamide, N-ethylacrylamide, N-isopropylacrylamide, N-methylolacrylamide, N-methylmethacrylamide, N-ethylmethacrylamide, N-isopropylmethacrylamide, N-methylolmethacrylamide, N,N-dimethylacrylamide, N,N-diethylacrylamide, N,N-dimethylmethacrylamide, and N,N-diethylmethacrylamide; a styrenic monomer, including styrene, α-methylstyrene and hydroxystyrene; N-vinylpyrrolidone; N-vinylformamide; N-vinylamide; and N-vinylimidazole.

The weight average molecular weight of the self-curable copolymer may be any suitable molecular weight, but in some embodiments of the invention, the weight average molecular weight in a range of about 1,000 and about 1,000,000 g/mol. When the self-curable copolymer has a weight average molecular weight lower than about 1,000 g/mol, sufficient curability of the self-curable copolymer may not be achieved. Meanwhile, when the self-curable copolymer has a weight average molecular weight greater than about 1,000,000 g/mol, the solubility of the self-curable copolymer in an organic solvent may be decreased and/or the resin composition may produce less desirable films.

In some embodiments of the invention, the epoxy compound may include a bisphenol A-type epoxy resin, a bisphenol F-type epoxy resin, a phenol novolac-type epoxy resin, a cresol novolac-type epoxy resin, or any mixture thereof. In some embodiments, the epoxy compound may have a weight average molecular weight in a range of about 500 to about 10,000 g/mol.

In some embodiments of the invention, the thermosetting one solution-type compositions may also include an organic solvent. Any suitable organic solvent may be used, but exemplary organic solvents include ethylene glycols, including ethylene glycol and diethylene glycol; glycol ethers, including ethylene glycol monomethyl ether, diethylene glycol monomethyl ether, ethylene glycol diethyl ether, and diethylene glycol dimethyl ether; glycol ether acetates, including ethylene glycol monoethyl ether acetate, diethylene glycol monoethyl ether acetate, and diethylene glycol monobutyl ether acetate; propylene glycols; propylene glycol ethers, including propylene glycol monomethyl ether, propylene glycol monoethyl ether, propylene glycol monopropyl ether, propylene monobutyl ether, propylene glycol dimethyl ether, dipropylene glycol dimethyl ether, propylene glycol diethyl ether, and dipropylene glycol diethyl ether; propylene glycol ether acetates, including propylene glycol monomethyl ether acetate and dipropylene glycol monoethyl ether acetate; amides, including N-methylpyrrolidone, dimethylformamide, and dimethylacetamide; ketones, including methyl ethyl ketone (MEK), methyl isobutyl ketone (MIBK), and cyclohexanone; petroleum solvents, including toluene, xylene, and solvent naphtha; esters, including ethyl acetate, butyl acetate, and ethyl lactate; and mixtures thereof.

In some embodiments, the resin composition comprises an organic solvent in a range of about 10 to about 98% by weight, and in some embodiments, in a range of about 50 to about 95% by weight, based on the total weight of the resin composition. When the organic solvent is present in an amount less than about 10% by weight, the composition may produce less desirable films. Meanwhile, when the organic solvent is present in an amount exceeding about 98% by weight, it may be difficult to form a protective film with a sufficient thickness.

The resin compositions according to some embodiments of the present invention may further include a silane coupling agent which may improve the adhesion between a protective film and an underlayer. Exemplary silane coupling agents include amine-terminated silanes, di-alkoxy silanes, monoalkoxysilanes, tri-alkoxy silanes and trichlorosilanes. In some embodiments, the silane coupling agent may be present in an amount in a range of about 0.1 to about 30 parts by weight, based on 100 parts by weight of the self-curable copolymer. If the silane coupling agent is used in an amount of less than about 0.1 parts by weight, the improvement in adhesion may not be significant. However, if the silane coupling agent is used in an amount of more than about 30 parts by weight, the resin composition may produce less desirable films, and may result in the formation of pin holes.

The self-curable copolymer may be synthesized by any suitable method. However, in some embodiments of the invention, the self-curable copolymer may be synthesized by radical polymerization. Radical polymerization initiators that may be used in the synthesis of the self-curable copolymer may include any suitable initiator, including thermal polymerization initiators, photopolymerization initiators and redox initiators. In some embodiments, peroxide type and azo type radical polymerization initiators may be used to synthesize the self-curable copolymers due to their relative ease of handling and relative ability to control the reaction rate and molecular weight.

Examplary peroxide type polymerization initiators include methyl ethyl ketone peroxide, cyclohexanone peroxide, methyl cyclohexanone peroxide, acetyl acetone peroxide, 1,1-bis(tert-butylperoxy)-3,3,5-trimethylcyclohexane, 1,1-bis(tert-butylperoxy)cyclohexane, 1,1-bis(tert-hexylperoxy)-3,3,5-trimethylcyclohexane, 1,1-bis(tert-hexylperoxy)cyclohexane, 1,1-bis(tert-butylperoxy)cyclododecane, isobutyl peroxide, lauroyl peroxide, succinic acid peroxide, 3,5,5-trimethylhexanoyl peroxide, benzoyl peroxide, octanoyl peroxide, stearoyl peroxide, diisopropyl peroxydicarbonate, di-n-propyl peroxydicarbonate, di-2-ethylhexyl peroxydicarbonate, di-2-ethoxyethyl peroxydicarbonate, di-2-methoxybutyl peroxydicarbonate, bis-(4-tert-butylcyclohexyl)peroxydicarbonate, (α,α-bis-neodecanoylperoxy) diisopropylbenzene, cumyl peroxyneodecanoate, octyl peroxyneodecanoate, hexyl peroxyneodecanoate, tert-butyl peroxyneodecanoate, tert-hexyl peroxypivalate, tert-butyl peroxypivalate, 2,5-dimethyl-2,5-bis(2-ethylhexanoylperoxy)hexane, 1,1,3,3-tetramethylbutylperoxy-2-ethylhexanoate, peroxy-2-ethyl-tert-hexyl hexanoate, peroxy-2-ethyl-tert-butyl hexanoate, peroxy-2-ethyl-tert-butyl hexanoate, peroxy-3-methyl-tert-butyl propionate, tert-butyl peroxylaurate, tert-butylperoxy-3,5,5-trimethylhexanoate, tert-hexyl peroxyisopropyl monocarbonate, tert-butylperoxy isopropyl carbonate, 2,5-dimethyl-2,5-bis(benzoylperoxy) hexane, tert-butyl peracetate, tert-hexyl perbenzoate, tert-butyl perbenzoate, and any combination thereof. Combinations of the peroxide type polymerization initiators with reductants may also be useful as redox initiators.

Examplary azo-type polymerization initiators include 1,1-azobis(cyclohexane-1-carbonitrile), 2,2'-azobis(2-methylbutyronitrile), 2,2'-azobisbutyronitrile, 2,2'-azobis(2,4-dimethyl-valeronitrile), 2,2'-azobis(2,4-dimethyl-4-methoxyvaleronitrile), 2,2'-azobis(2-amidino-propane) hydrochloride, 2,2'-azobis[2-(5-methyl-2-imidazolin-2-yl) propane]hydrochloride, 2,2'-azobis[2-(2-imidazolin-2-yl) propane]hydrochloride, 2,2'-azobis[2-(5-methyl-2-imidazolin-2-yl)propane], 2,2'-azobis[2-methyl-N-(1,1-bis(2-hydroxymethyl)-2-hydroxyethyl]propionamide, 2,2'-azobis [2-methyl-N-(2-hydroxyethyl)propionamide], 2,2'-azobis(2-methyl-propionamide) dihydrate, 4,4'-azobis(4-cyano-valeic acid), 2,2'-azobis(2-hydroxymethylpropionitrile), 2,2'-azobis(2-methylpropionic acid)dimethyl ester (dimethyl-2,2'-azobis(2-methylpropionate)), cyano-2-propylazoformamide and any combination thereof.

In some embodiments of the invention, at least one known molecular weight-controlling agent, such as a chain-transfer agent, a chain-terminating agent or a polymerization promoter, may be added during the synthesis of the self-curable copolymer in order to control the molecular weight of the self-curable copolymer. Exemplary molecular weight-controlling agents include mercaptopropionic acid, mercaptopropionate, thioglycol, thioglycerin, dodecylmercaptan and α-methylstyrene dimers.

In some embodiments, the self-curable copolymer may be synthesized by radical polymerization in the same organic solvent as that is present in the one-solution type thermosetting resin composition that includes the copolymer. Thus, the solvent used for the synthesis of the self-curable copolymer is not particularly restricted, but may be an organic solvent that is also present as a component of the one-solution type thermosetting resin composition including the self-curable copolymer.

The amount of the organic solvent used in the synthesis of a self-curable copolymer according to an embodiment of the invention may be controlled such that the monomers used to synthesize the self-curable copolymer may be present in the solution in an amount in a range of about 5 to about 60% by weight, and in some embodiments, in a range of about 15 to 35% by weight, relative to the weight of the total solution. When the concentration of the monomers used to synthesize the self-curable copolymer in the solution is less than about 5% by weight, the polymerization rate may be undesirably slow and some of the monomers may remain unreacted. Meanwhile, when the concentration of the self-curable copolymer in the solution exceeds about 60% by weight, the solution may be highly viscous, making it difficult to handle and to control the reaction rate.

Additional solvents may used during the synthesis of the copolymer, such as those that help solubilize the monomers and/or polymers in solution, and those that control the leveling properties and drying rate after the polymerization.

In addition, a copolymer thus prepared may be precipitated for the purpose of purification, storage and solvent change. The solid copolymer may also be also used to constitute a one-solution-type thermosetting resin composition according to the present invention. Precipitation may be performed by spray drying, film drying, addition to poor solvents, re-dipping, and the like, but is not limited thereto.

To improve the etch and/or alkali resistance and control the fluidity of a one-solution type thermosetting resin composition, in some embodiments of the invention, at least one other polymer may be added to the resin composition. Any suitable polymer(s) may be used, but exemplary polymers include poly(meth)acrylate, nylon, polyester, polyimide and polysilicone.

In some embodiments, the at least one other polymer is present in the composition in an amount in a range of about 50 parts by weight or less, based on 100 parts by weight of the self-curable copolymer.

In some embodiments of the invention, a thermosetting reaction catalyst may be present in the one-solution type thermosetting resin composition. Any suitable catalyst may be used, but examplary thermosetting reaction catalysts include amine compounds, phosphorus compounds, boron compounds, antimony compounds, carboxylic acid compounds and organic sulfonic acid compounds. In some embodiments, the thermosetting reaction catalyst may be present in an amount of about 10 parts by weight or less, based on 100 parts by weight of the self-curable polymer, which may provide suitable storage stability.

In some embodiments of the invention, the one-solution type thermosetting resin composition of the present invention may be blended with other known agents, e.g., antioxidants, infrared stabilizers, plasticizers, leveling agents, coupling agents and fillers.

In some embodiments of the invention, the one-solution type thermosetting resin composition may be applied to a substrate. The one-solution type thermosetting resin composition may be applied to a substrate by any known technique, e.g., screen printing, curtain coating, blade coating, spin coating, spray coating, dip coating, flow coating, roll coating, slit coating, or the like, to form a film. In some embodiments, the film thus formed may have a thickness in a range of about 0.1 to about 5 μm, and in some embodiments, in a range of about 0.3 to about 2 μm, after subsequent drying. When the film has a thickness less than about 0.1 μm, sufficient flatness with respect to step height may not be attained. However, when the film has a thickness greater than about 5 μm, the transmittance of the film may be decreased, considerable drying and curing time may be required and the films may be less suitable for applications such as protective films for color filters.

In some embodiments of the invention, the substrate coated with a one-solution type thermosetting resin composition according to an embodiment of the present invention may undergo drying and heat-curing processes to evaporate the solvent and cure the polymer to form a sufficiently hard film. The drying and the heat-curing processes may be carried out simultaneously or individually. In addition, the drying and heat-curing processes may be carried out individually, which may reduce the formation of foams and cracks on the film.

Any suitable apparatus may be used for the drying process, and examples thereof include hot-air dryers, far-infrared dryers and hot plates. In some embodiments, the drying process may be carried out at a temperature in a range of about 50° C. to about 150° C. The drying time varies depending on the capacity of a dryer employed, air flow, temperature and film thickness. In some embodiments, the drying time may be in the range of about 1 to about 10 minutes.

Any suitable apparatus for curing may be used, and examples thereof include hot-air ovens, far-infrared ovens and hot plates. Curing may not be satisfactorily achieved below about 150° C. However, depolymerization and carbonization of the polymers may occur above 250° C., which may result in decreased performance of the final protective film. Thus, in some embodiments, the heat-curing process may be carried out at a temperature in a range of about 150° C. to about 250° C.

In some embodiments of the invention, provided are substrates including a film formed thereon, wherein the film is formed from a composition according to an embodiment of the invention. Also provided are methods of forming a film on a substrate including applying a composition according to an embodiment of the invention, and subjecting the composition to conditions sufficient to cure the composition.

Also provided herein are color filters that include a protective film formed from a composition according to an embodiment of the invention.

In addition, provided herein are liquid crystal displays and image sensors that include a color filter according to an embodiment of the invention.

Hereinafter, the present invention will be explained in more detail with reference to the following examples and comparative examples. However, these examples are given for the purpose of illustration and are not intended to limit the scope of the invention.

EXAMPLES

Example 1

300 g of propylene glycol monomethyl ether acetate (PGMEA) was added to a 500 ml flask equipped with a reflux condenser and an agitator, and the temperature was raised to 80° C. with stirring. A mixture of 32 g of glycidyl methacrylate, 15 g of 2-hydroxyethylmethacrylate, 15 g of methacrylic acid, 10 g of N-phenylmaleimide, 28 g of styrene and 8 g of dimethyl-2,2'-azobis(2-methylpropionate) was added dropwise to the flask for 1-1.5 hours while maintaining the temperature at 80° C. with stirring. The resulting mixture was allowed to react for 4-5 hours with stirring while maintaining the reaction temperature at 80° C. to obtain a transparent polymer solution (a). Gel permeation chromatography (GPC) of the solution indicated a weight average molecular weight of 28,000, as measured using a polystyrene standard.

To 40 g of the polymer solution (a) was added 3.5 g of an epoxy resin (Epikote 152, JER), 1.4 g of a silane coupling agent (S-510, Chisso), 0.12 g of a surfactant (F-475, DIC) and 30 g of PGMEA. The mixture was sufficiently dissolved by stirring, and filtered to prepare a desired one-solution type thermosetting resin composition (e) for a protective film of a color filter.

The one-solution type thermosetting resin composition (e) was applied to a 0.7 mm thick glass substrate (#1737, Corning) using a spin coater, dried in a dryer at 80° C. for 3 minutes, and cured at 230° C. for 50 minutes to produce a 1.5 μm thick transparent protective film. A color filter was produced using the protective film.

Example 2

300 g of PGMEA was added to a 500 ml flask equipped with a reflux condenser and an agitator, and the temperature was raised to 80° C. with stirring. A mixture of 32 g of glycidyl methacrylate, 10 g of 2-hydroxyethylmethacrylate, 20 g of methacrylic acid, 10 g of N-phenylmaleimide, 28 g of styrene and 8 g of dimethyl-2,2'-azobis(2-methylpropionate) was added dropwise to the flask for 1-1.5 hours while maintaining the temperature at 80° C. with stirring. The resulting mixture was allowed to react for 4-5 hours with stirring while maintaining the reaction temperature at 80° C. to obtain a transparent polymer solution (b). Gel permeation chromatography (GPC) of the solution indicated a weight average molecular weight of 30,000, as measured using a polystyrene standard.

A one-solution type thermosetting resin composition (f) for a protective film of a color filter was prepared in the same manner as in Example 1, except that 40 g of the polymer solution (b) was used instead of the polymer solution (a).

A 1.5 μm thick transparent protective film and a color filter were produced using the one-solution type thermosetting resin composition (f), in accordance with the procedure described in Example 1.

Example 3

300 g of PGMEA was added to a 500 ml flask equipped with a reflux condenser and an agitator, and the temperature was raised to 80° C. with stirring. A mixture of 32 g of glycidyl methacrylate, 10 g of 2-hydroxyethylmethacrylate, 20 g of methacrylic acid, 5 g of N-phenylmaleimide, 33 g of styrene and 8 g of dimethyl-2,2'-azobis(2-methylpropionate) was added dropwise to the flask for 1-1.5 hours while maintaining the temperature at 80° C. with stirring. The resulting mixture was allowed to react for 4-5 hours with stirring while maintaining the reaction temperature at 80° C. to obtain a transparent polymer solution (c). Gel permeation chromatography (GPC) of the solution indicated a weight average molecular weight of 33,000, as measured using a polystyrene standard.

A one-solution type thermosetting resin composition (g) for a protective film of a color filter was prepared in the same manner as in Example 1, except that 40 g of the polymer solution (c) was used instead of the polymer solution (a).

A 1.5 μm thick transparent protective film and a color filter were produced using the one-solution type thermosetting resin composition (g), in accordance with the procedure described in Example 1.

Comparative Example 1

300 g of PGMEA was added to a 500 ml flask equipped with a reflux condenser and an agitator, and the temperature was raised to 80° C. with stirring. A mixture of 32 g of glycidyl methacrylate, 35 g of dicyclopentanyl methacrylate, 33 g of styrene and 8 g of dimethyl-2,2'-azobis(2-methylpropionate) was added dropwise to the flask for 1-1.5 hours while maintaining the temperature at 80° C. with stirring. The resulting mixture was allowed to react for 3 hours with stirring while maintaining the reaction temperature at 80° C. to obtain a transparent polymer solution (d). Gel permeation chromatography (GPC) of the solution indicated a weight average molecular weight of 27,000, as measured using a polystyrene standard.

To 40 g of the polymer solution (d) were added 3.5 g of an epoxy resin (Epikote 152, JER), 1.4 g of a silane coupling agent (S-510, Chisso), 3.1 g of a surfactant (F-475, DIC), and 31 g of PGMEA. The mixture was sufficiently dissolved by stirring, and filtered to prepare a desired one-solution type thermosetting resin composition (h) for a protective film of a color filter.

A 1.5 μm thick transparent protective film and a color filter were produced using the one-solution type thermosetting resin composition (h), in accordance with the procedure described in Example 1.

Evaluation of Physical Properties

The protective films and color filters produced in Examples 1-3 and Comparative Example 1 were evaluated for flatness, adhesiveness, film strength and heat resistance in accordance with the procedures described below. The thermosetting resin compositions prepared in Examples 1-3 and Comparative Example 1 were also evaluated for storage stability. The results are shown in Table 1 below.

i) Evaluation of Flatness

First, the difference in the height between center portions of red and green pixels (i.e., the step height between the pixels) of a dummy color filter was measured. Next, after each of the protective films produced in Examples 1-3 and Comparative Example 1 was applied to the color filter, the step height between the pixels of the color filter was measured. The ratio R of the step height (d1) before the application of the protective film to the step height (d2) after the application of the protective film was calculated by Equation (1):

$R = d2/d1$ (1)

The ability of the protective film compositions prepared in Examples 1-3 and Comparative Example 1 to form flat films was classified into five grades, based on the following criteria:

| Ratio | Grade |
| --- | --- |
| R > 0.4 | 1 |
| 0.4 ≦ R ≦ 0.3 | 2 |
| 0.3 < R ≦ 0.2 | 3 |
| 0.2 < R ≦ 0.1 | 4 |
| R < 0.1 | 5 |

The higher the grade, the better the flattening performance.

ii) Tests for Adhesiveness and Chemical Resistance

After one hundred cross-cuts were scribed in the shape of check scales on the protective films produced in Examples 1-3 and Comparative Example 1, a peeling test (a cross-cut test) was conducted using a cellophane tape. The peeling state of the cross-cuts was checked by visual inspection to evaluate the adhesiveness.

Further, after the protective films were sequentially dipped in N-methyl-2-pyrrolidone (NMP), a 10% aqueous potassium hydroxide solution and an etchant solution (CYANTEK CORPORATION LCE-12K) at 40° C. for 30 minutes, the adhesiveness test procedure described above was repeated to evaluate the chemical resistance. The peeling of the cross-cuts was observed. When no cross-cuts peeled after the dipping procedure, the chemical resistance against the solvent and solutions was deemed to have "passed". When at least one cross-cut was peeled after the dipping procedure, the chemical resistance against the solvent and solutions was deemed to have "failed".

iii) Evaluation of Film Strength

After the transparent protective films produced in Examples 1-3 and Comparative Example 1 were scratched using six kinds (1H-6H) of pencils (Statdler), the films were observed for damage. The strength of the films was classified into six grades (1H-6H) according to the degree of the damage.

iv) Evaluation of Storage Stability

First, the initial viscosity of the thermosetting resin compositions prepared in Examples 1-3 and Comparative Example 1 was measured. While each of the resin compositions was placed in a 10 ml vial in an incubator at 40° C., the viscosity of the resin composition was measured once every three days for twelve days. The time period when an increase in viscosity exceeded 10% was expressed as 0, 3, 6, 9 or 12. 0 and 3 were evaluated to be "poor".

TABLE 1

| Example No. | Flatness | Adhesiveness | Chemical resistance | | | Transmittance | Film strength | Storage stability |
| --- | --- | --- | --- | --- | --- | --- | --- | --- |
| | | | Acid | Base | Organic solvent | | | |
| Example 1 | 4 | 100/100 | Passed | Passed | Passed | 99% | 5H | 6 |
| Example 2 | 4 | 100/100 | Passed | Passed | Passed | 98% | 5H | 9 |
| Example 3 | 3 | 100/100 | Passed | Passed | Passed | 99% | 5H | 9 |
| Comparative Example 1 | 2 | 99/100 | Passed | Failed | Failed | 98% | 3H | 6 |

As can be seen from the data shown in Table 1, one-solution type thermosetting resin compositions according to embodiments of the present invention may be convenient to use and may provide improved chemical resistance, compared to conventional two-solution type thermosetting resin compositions for color filters. In addition, the protective films may exhibit superior flatness, adhesiveness, transmittance, film strength and heat resistance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A thermosetting one solution-type composition for a protective film for a color filter, comprising:
   (i) about 1 to about 45% by weight of a self-curable copolymer comprising a repeating unit of each of Formulae I, II, III and IV:

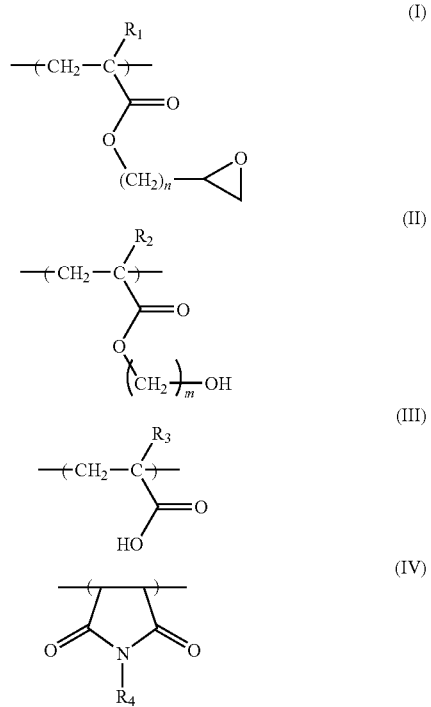

wherein $R_1$, $R_2$ and $R_3$ are each independently hydrogen or an alkyl group; $R_4$ is selected from the group consisting of alkyl, aryl, alkylaryl and alkoxyaryl; and n and m are each independently an integer from about 1 to about 10; and
   (ii) about 1 to about 45% by weight of an epoxy compound different from said self-curable copolymer and having at least two epoxy groups per molecule.

2. The composition of claim 1, wherein $R_1$, $R_2$ and $R_3$ are each independently hydrogen or a methyl group; $R_4$ is selected from the group consisting of $C_1$-$C_4$ linear alkyl, $C_5$-$C_{13}$ cycloalkyl, phenyl, $C_1$-$C_4$ alkyl-substituted phenyl and $C_1$-$C_4$ alkyloxy-substituted phenyl.

3. The composition of claim 1, further comprising about 10 to about 98% by weight of an organic solvent.

4. The composition of claim 1, wherein the self-curable copolymer comprises about 10 to about 89 mol % of the repeating unit of Formula (I); about 5 to about 35 mol % of the repeating unit of Formula (II); about 5 to about 35 mol % of the repeating unit of Formula (III); and about 1 to about 20 mol % of the repeating unit of Formula (IV).

5. The composition of claim 1, wherein the epoxy compound (ii) is selected from the group consisting of a bisphenol A-type epoxy resin, a bisphenol F-type epoxy resin, a phenol novolac-type epoxy resin, a cresol novolac-type epoxy resin, and any mixture thereof.

6. The composition of claim 1, wherein the self-curable copolymer further comprises at least one repeating unit selected from the group consisting of an acrylate monomer, a methacrylate monomer, an acrylamide monomer, a methacrylamide monomer, a styrene monomer, N-vinylpyrrolidone, N-vinylformamide, N-vinylamide and N-vinylimidazole.

7. The composition of claim 6, wherein the acrylate monomer comprises at least one of methyl acrylate, ethyl acrylate, propyl acrylate, isopropyl acrylate, butyl acrylate, and benzyl acrylate; the methacrylate monomer comprises at least one of methyl methacrylate, ethyl methacrylate, propyl methacrylate, isopropyl methacrylate, butyl methacrylate, and benzyl methacrylate; the acrylamide monomer comprises at least one of N-methylacrylamide, N-ethylacrylamide, N-isopropylacrylamide, N-methylolacrylamide, N,N-dimethylacrylamide, N,N-diethylacrylamide; the methacrylamide monomer comprises at least one of N-methylmethacrylamide, N-ethylmethacrylamide, N-isopropylmethacrylamide, N-methylolmethacrylamide, N,N-dimethylmethacrylamide, and N,N-diethylmethacrylamide; and the styrene monomer comprises at least one of styrene, α-methylstyrene and hydroxystyrene.

8. The composition of claim 1, further comprising a silane coupling agent in an amount in a range of about 0.1 to about 30 parts by weight, based on 100 parts by weight of the self-curable copolymer.

9. A substrate having a film formed thereon, wherein the film is formed from a composition according to claim 1.

10. A color filter comprising a film formed from a composition according to claim 1.

11. A liquid crystal display comprising the color filter according to claim 10.

12. An image sensor comprising the color filter of claim 10.

13. A method of forming a film on a substrate comprising applying a composition according to claim 1 to a substrate; and
   subjecting the composition to conditions sufficient to cure the composition.

* * * * *

UNITED STATES PATENT AND TRADEMARK OFFICE
CERTIFICATE OF CORRECTION

PATENT NO. : 7,722,932 B2
APPLICATION NO. : 11/623866
DATED : May 25, 2010
INVENTOR(S) : Kwon et al.

Page 1 of 1

It is certified that error appears in the above-identified patent and that said Letters Patent is hereby corrected as shown below:

Column 2, Line 21: Please correct "Formulae I, I" to read -- Formulae I, II --

Signed and Sealed this

Nineteenth Day of October, 2010

David J. Kappos
*Director of the United States Patent and Trademark Office*